March 13, 1934.  F. H. BARTZ  1,950,381
AUTOMATIC TAKE-UP FOR BRAKES
Filed March 3, 1930
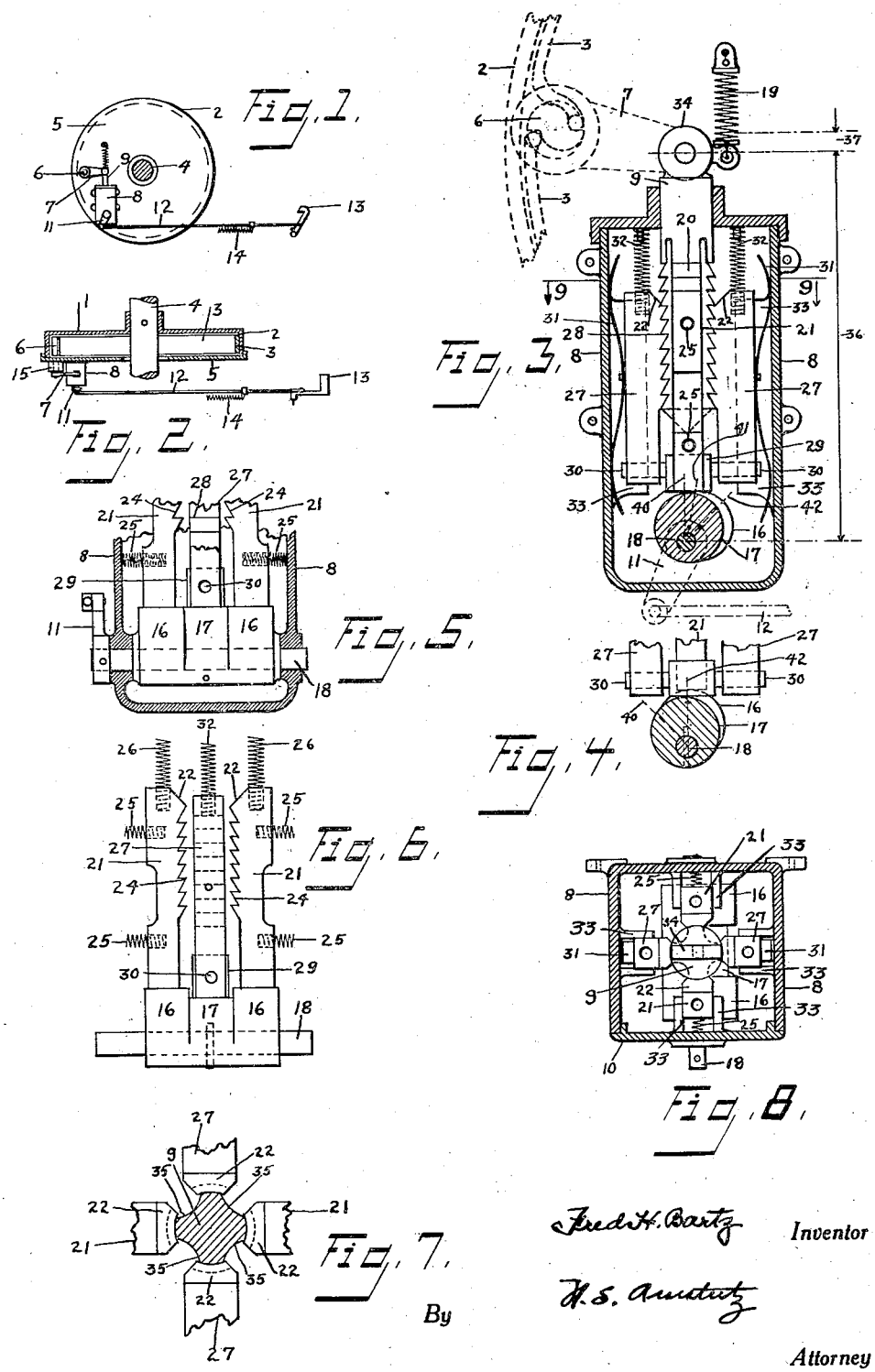
Fred H. Bartz  Inventor
By H. S. Amstutz
Attorney Patented Mar. 13, 1934

1,950,381

UNITED STATES PATENT OFFICE 1,950,381

AUTOMATIC TAKE-UP FOR BRAKES

Fred H. Bartz, Valparaiso, Ind.

Application March 3, 1930, Serial No. 432,854

4 Claims. (Cl. 188—79.5)

My invention relates to improvements in automatic take-up for brakes etc., and it more especially consists of the features pointed out in the annexed claims.

The purpose of my invention is to provide an automatic take-up to compensate for the wear of any parts which are subject to friction, such as brake bands, etc., etc., that interposes between the normal adjustment of the part which is subject to wear and its control, an automatic take-up for the wear; and that easily restores the mechanism to its initial stage when a worn part is replaced.

With these and other ends in view, I illustrate in the accompanying drawing such instances of adaptation as will disclose the broad underlying features of the invention without limiting myself to the specific details shown thereon and described herein.

Figure 1 is a side elevation of the device associated with an automobile brake.

Fig. 2 is a plan view of Fig. 1.

Fig. 3 is a side elevation in section, showing the cam in its inactive position.

Fig. 4 is a detached diagrammatic side view showing the cam in its active position.

Fig. 5 is a diagrammatic front elevation showing the cam inactive.

Fig. 6 is a view similar to Fig. 5 showing the cam active.

Fig. 7 is a diagrammatic elevation of a modified casing.

Fig. 8 is a plan view in section on line 9—9 Fig. 3.

In installing my device I may use whatever alternatives or equivalents of structure that the exigencies of varying conditions of service may require without departing from the broad scope of the invention.

The adaptation shown on the drawing is in connection with automobile brakes, but I do not limit myself to this specific use as the invention may be applied to many different devices. As instanced, a brake drum 1 is secured to a rotating axle 4 of the automobile. It has a rim 2, inside of which the usual form of internal brake band 3 is located. I do not limit myself to the application of my device to internal or purely mechanical brakes. A stationary closing disk 5 prevents the ingress of dirt etc., to the brake. This disk carries a stem 6 which has projections which engage the free ends of the brake band. It has bearing in a projecting boss 15. On the outside of this boss, a short crank 7 is attached to the stem. This crank engages the flattened upper end 34 of the operating stem 9 which serves to always keep its teeth in line with the teeth of the jaws 21 and the teeth of the jaws 27, when the parts are in working relation.

Any desired form of casing 8 may be used to house the mechanism. It may have a removable top 10 and a front cover as desired. At the bottom end of the casing a cam shaft 18 is positioned. On this shaft the cams 16 and 17 are secured within the casing, and on the outside a crank 11 is attached. To this is attached a rod 12 which leads to a foot pedal 13 of any well known type. A spring 14 serves to keep the foot pedal raised.

The stem 9 where the teeth 20 are formed may be round or square. If square, its upper end will be round to permit of its being turned on its axis whenever a worn brake band is replaced. This provision is made so that it can be readily dropped to its lowest position without dismantling the device. Lengthwise grooves 35 are formed so as to eliminate the teeth 20. This permits the stem being pushed endwise, with its teeth out of engagement with the teeth of the jaws. As soon as it is in its lowest or reset position it is again turned on its axis so as to bring the different teeth into engagement with each other. Whenever it is found necessary to entirely remove the stem 9 for repairs or reassembling, it is easily done because the lower end of the stem is conical. This shape cooperates with the beveled upper ends of the jaws 21 and 27 to press them apart to admit the stem to pass downward between them.

There are two main or working jaws 21 which can slide up and down between flanges 33 of the casing 8, under the raising action of cams 16 and the lowering action of springs 28 placed between the upper ends of the jaws and the casing top 10. The jaws are moved sidewise so that their teeth remain in engagement with the teeth of the stem 9, by means of coil springs 25, or flat springs 31. The jaws 27 are for compensating or take-up purposes. They also slide between flanges 33 of the casing. At their bottom end they are yieldably joined by a center block 29 which has rounded projections 30 on which the jaws may slide in and out under the tension of flat springs 31 or coil springs 25 as desired. Their upward movement is produced by the shorter radius cam 17 against the tension of springs 32.

As soon as the brake shoes have worn beyond a certain point and the brake is applied by the driver, the differential cam moves from point 40 (Fig. 3) to point 42 (Fig. 4). During the time the brake is applied, cam 16 lifts the jaws 21 and the stem 9 as a unit, to a higher point than the block 29 is lifted by the cam 17. As a result of this the take-up jaws 27 move down one tooth relative to the stem 9. When the brakes are released the block 29 follows the surface of cam 17, thus dropping down a distance corresponding to the normal brake-shoe clearance, but the jaws 21 by following the cams 16 drop through a greater distance, and as a result, the take-up jaws 21 move down relative to the stem 9 to the extent of one tooth and the stem 9 and this stem has thus been raised to the extent of one tooth relative to both jaws 21 and 27. These movements complete the adjustment. In any subsequent application of the brakes, jaws 21 and 27 and the stem 9 move together as a unit until sufficient wear of the brake bands again develops to permit the stem 9 being moved upward relative to said jaws in the manner described above.

The operation of my device will be readily understood, if for the sake of illustration it is assumed that the stem 9 were only actuated by a single cam, such as the cam 17. On this assumption if the cam were rocked from its lower to its higher position the stem 9 would be raised, the crank 7 moved and the stem 6 would set the brake band 3 inside the rim 2 (Figs. 1 and 2). An opposite movement of the cam would lower the stem 9, the crank 7 and release the brake.

In order to insure that the stem 9 will always move downward to press against the teeth of the jaws, a compression spring 19, shown in Fig. 3, engages the end of crank 7. The stem 6 actuated by the crank 7 moves the ends of the brake band away from each other to set the brake, and a spring, not shown, tends to pull the ends of the band toward each other to release the brake, when the crank is moved in the opposite direction. The only occasion when a manual adjustment of the stem 9 is required is when new brake shoes are being installed. Under these conditions the initial slack may be larger than can be taken up by a single operation of the differential cam 16, 17. In this event it would be necessary to lift the stem 9 and the crank 7 a short distance 37 (Fig. 3) in order to initially bring the brake shoe clearance within the normal range of the mechanism.

What I claim is:

1. In self compensating devices, a drum, means for frictionally engaging the drum, a foot lever for actuating the latter, and compensating means comprising differential cams attached to a single shaft placed between the foot lever and the means for frictionally engaging the drum, said cams and shaft constituting an actuating unit.

2. In self compensating brakes, a rotatable member, means for retarding the rotation of such member, means associated with the latter means for automatically compensating for the wear of the retarding means comprising a foot lever associated with an adjustable stem connected to the brake bands, and simultaneously acting cams of different throw interposed between the foot lever and the retarding means, said cams being adapted to differentially act on the stem.

3. In brake mechanisms, a wheeled vehicle, a brake drum attached to one or more wheels of the vehicle, cooperating brake shoes susceptible to wear, a foot lever for operating the brake shoes through a single shaft, a cam on the shaft for taking up the wear, and another cam actuating means on the same shaft, both cams constituting a unit for applying the brake shoes.

4. In brake mechanism, a drum, brake shoes for engaging the drum, a brake lever for operating the shoes, differentially actuating cams on a single shaft, one of said cams serving to automatically take up the wear of the brake shoes and the other cam adapted to apply the brake shoes to the drum, and a foot lever for operating the single shaft.

FRED H. BARTZ.